United States Patent [19]

Siekmeier et al.

[11] 4,330,085
[45] May 18, 1982

[54] LATERALLY MOBILE IRRIGATION SYSTEM

[75] Inventors: David A. Siekmeier; Glen L. Andersen, both of Columbus, Nebr.; Arthur L. Zimmerer, deceased, late of Lindsay, Nebr., by Bernadette Zimmerer, executor; by First National Bank and Trust Company, executor, Columbus, Nebr.; William P. Zimmerer, San Luis Obispo, Calif.

[73] Assignee: Lindsay Manufacturing Company, Lindsay, Nebr.

[21] Appl. No.: 194,565

[22] Filed: Oct. 6, 1980

Related U.S. Application Data

[63] Continuation of Ser. No. 955,941, Oct. 30, 1978, abandoned.

[51] Int. Cl.³ .................................................. A01G 25/09
[52] U.S. Cl. ........................................ 239/1; 137/899.1; 239/184; 239/711; 239/720; 239/721
[58] Field of Search .................. 239/1, 177, 179–181, 239/183, 184, 191, 709, 710, 718–721; 137/899.1

[56] References Cited

U.S. PATENT DOCUMENTS

| | | | |
|---|---|---|---|
| 3,373,936 | 3/1968 | Purtell | 239/720 X |
| 3,381,894 | 5/1968 | Purtell | 239/720 X |
| 3,583,428 | 6/1971 | Cornelius | 239/720 X |
| 3,587,763 | 6/1971 | Kinkead | 239/721 X |
| 3,608,825 | 9/1971 | Reinke | 239/719 X |
| 3,613,703 | 10/1971 | Stout | 239/1 |
| 3,707,164 | 12/1972 | Clemons | 239/181 |
| 3,726,478 | 4/1973 | McMurray | 239/181 |
| 3,811,617 | 5/1974 | Cornelius | 239/721 X |
| 3,974,845 | 8/1976 | Indresaeter | 239/184 X |
| 3,983,898 | 10/1976 | Zimmerer et al. | 239/177 X |
| 4,172,551 | 10/1979 | Johnson | 239/179 |

FOREIGN PATENT DOCUMENTS

| | | |
|---|---|---|
| 908223 | 8/1972 | Canada . |
| 943579 | 3/1974 | Canada . |
| 1041140 | 10/1978 | Canada . |
| 528912 | 4/1977 | U.S.S.R. . |

Primary Examiner—Andres Kashnikow
Attorney, Agent, or Firm—Kinzer, Plyer, Dorn & McEachran

[57] ABSTRACT

An overhead irrigation system and a method of controlling it whereby a main irrigation pipe, supported on towers, is moved laterally across a field. The towers at the extremities of the pipe are independently driven while the remaining towers move in response to misalignment between pipe segments caused by the motion of the outside towers. Proper overall direction of the system is maintained by a path sensor which detects deviation from the designated path and corrects it by slowing down the tower at the end toward which the correction is required, thereby causing the entire unit to pivot about a point on or beyond and in line with the end of the unit. Two-way misalignment sensors are capable of propagating a path correction signal along the entire length of the unit and in either direction. An engine, generator and pump are mounted in a sling support hung from the pipe.

43 Claims, 13 Drawing Figures

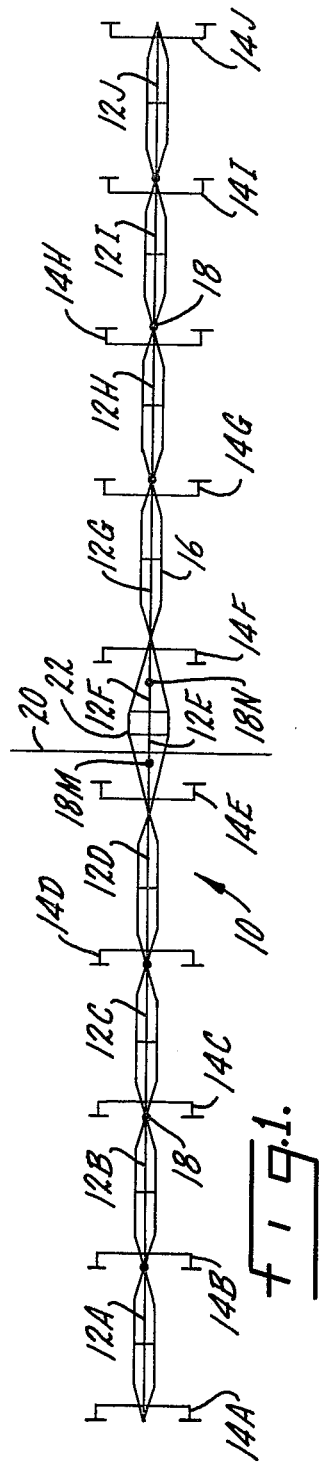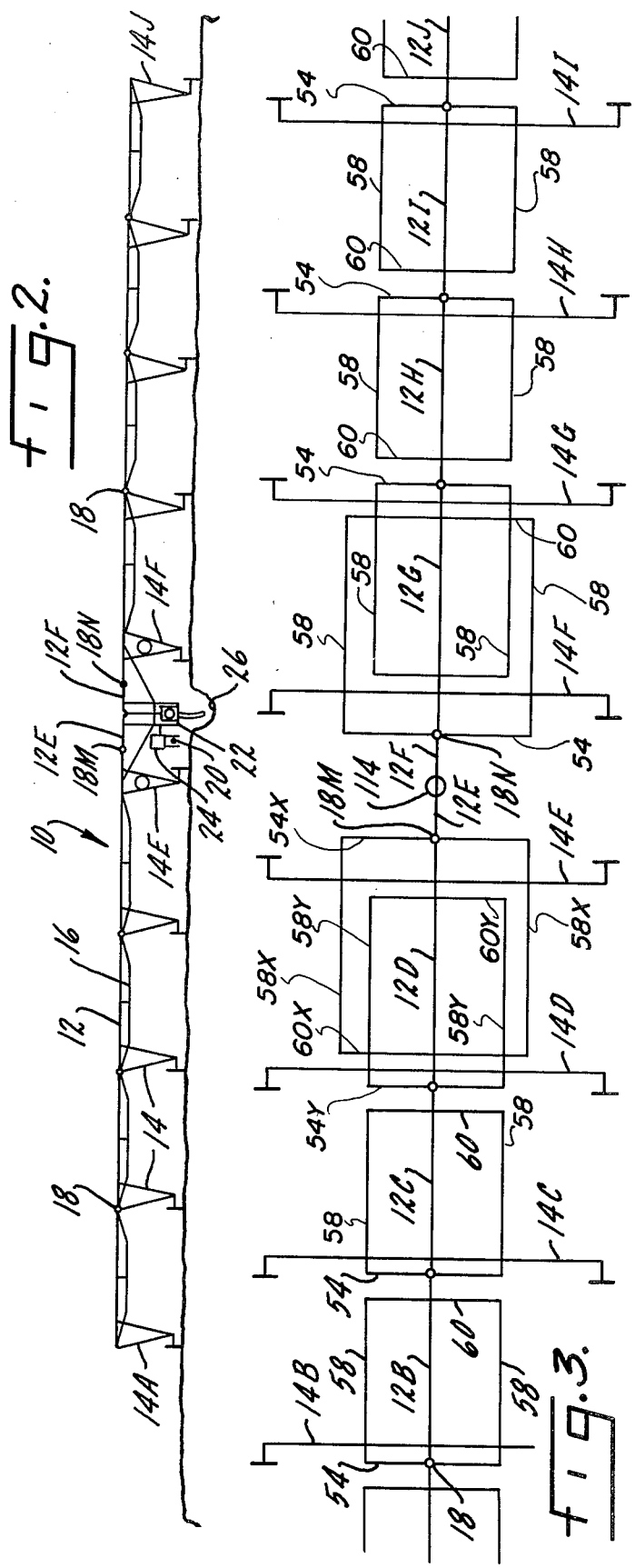

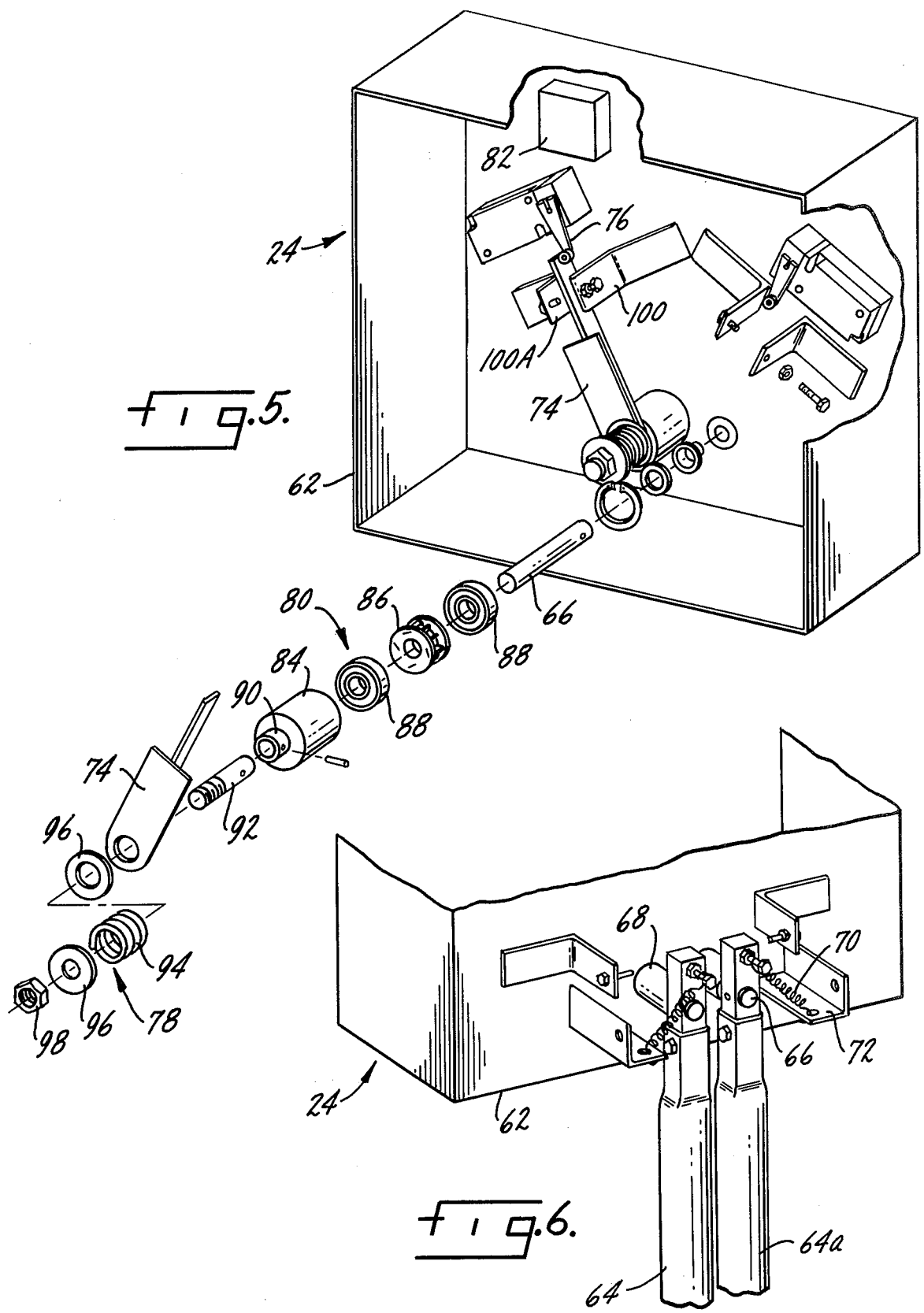

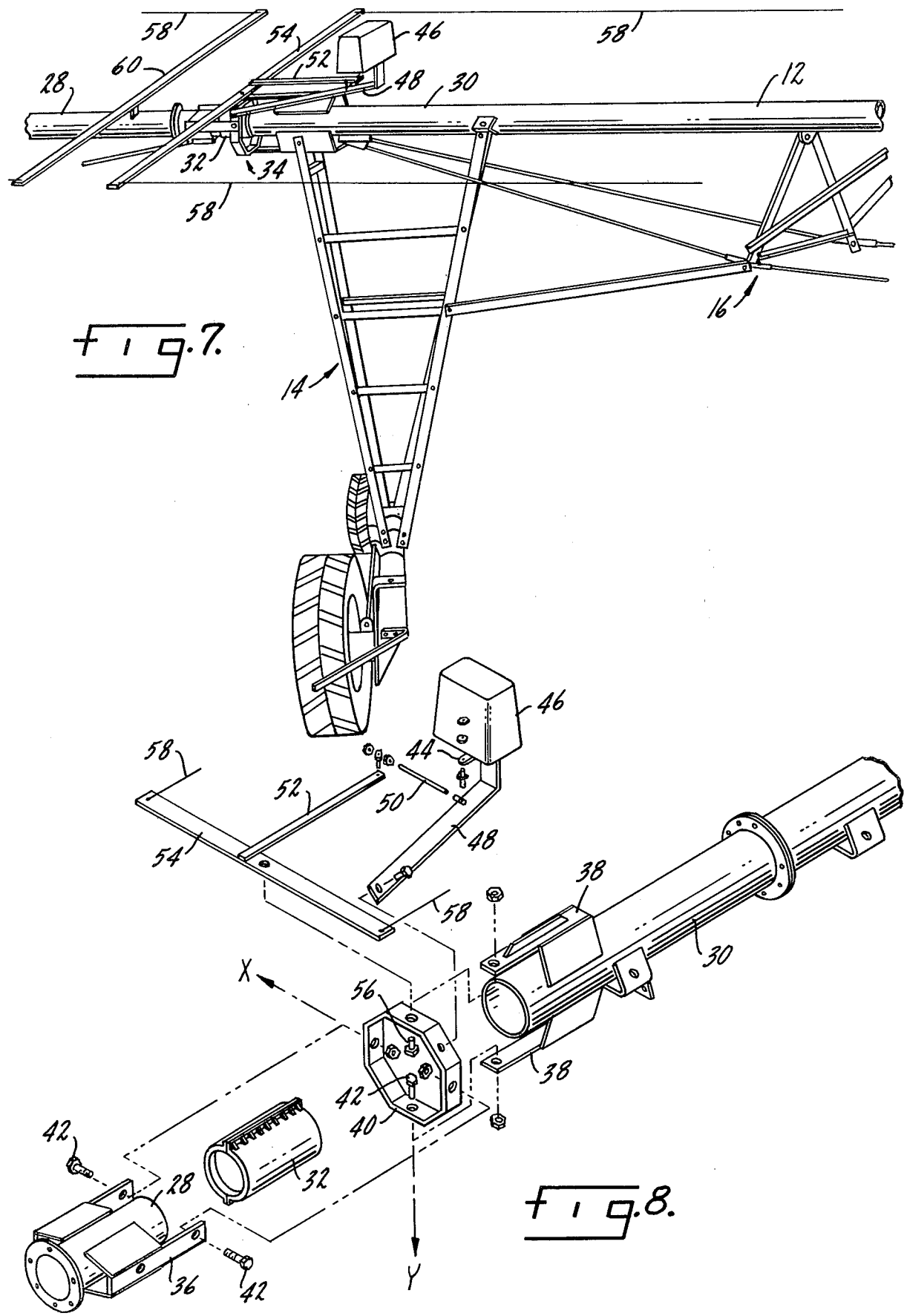

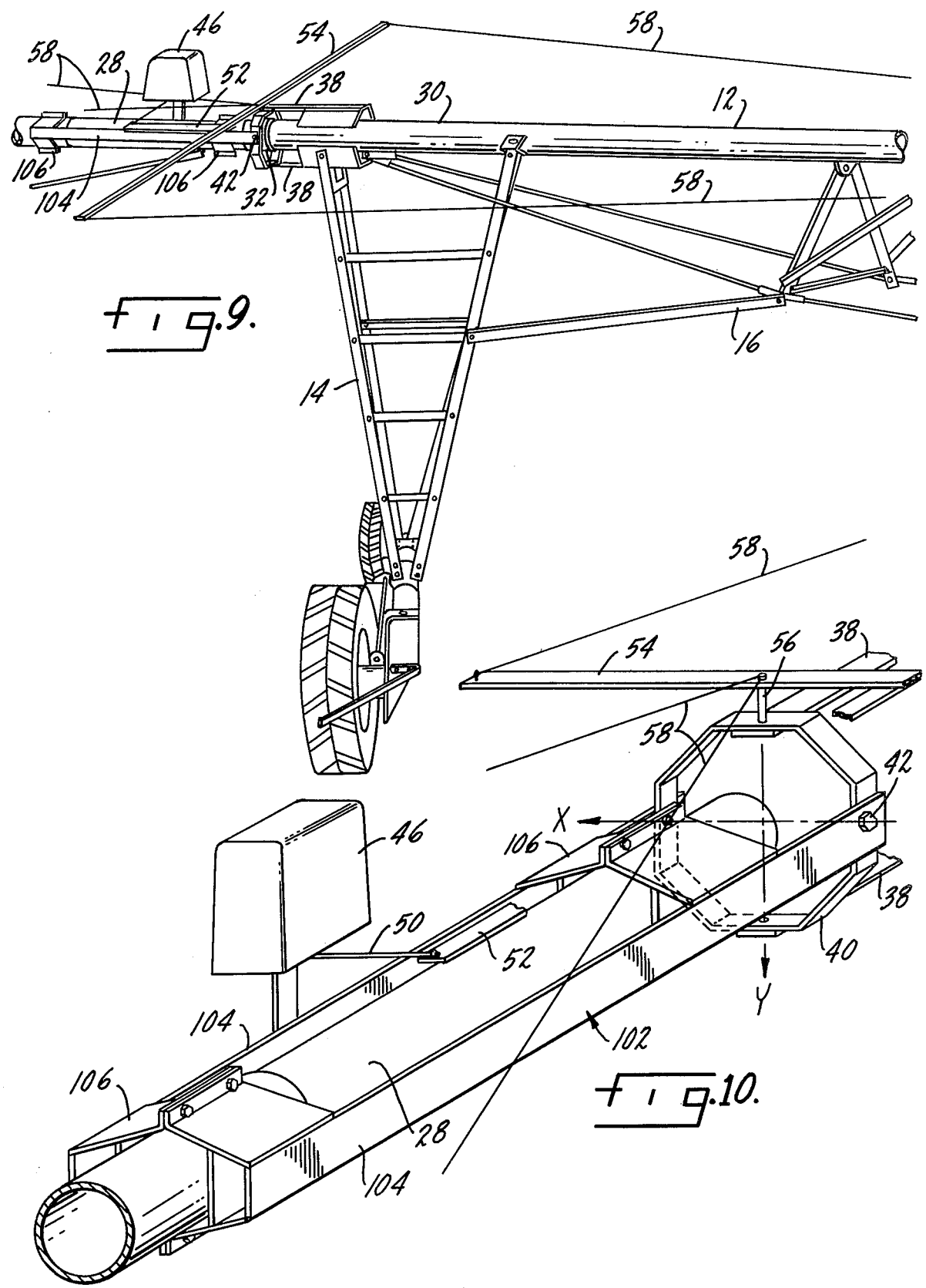

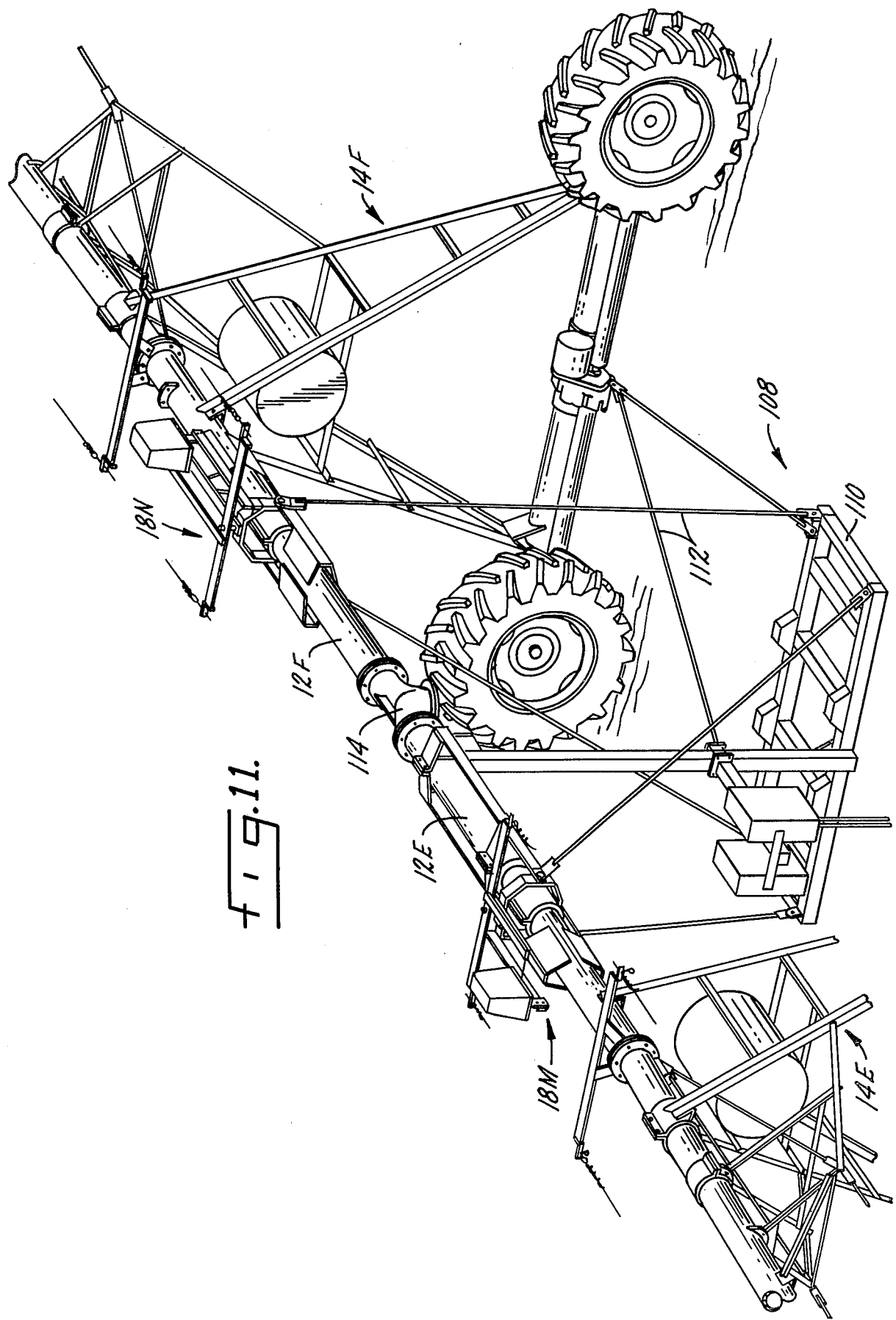

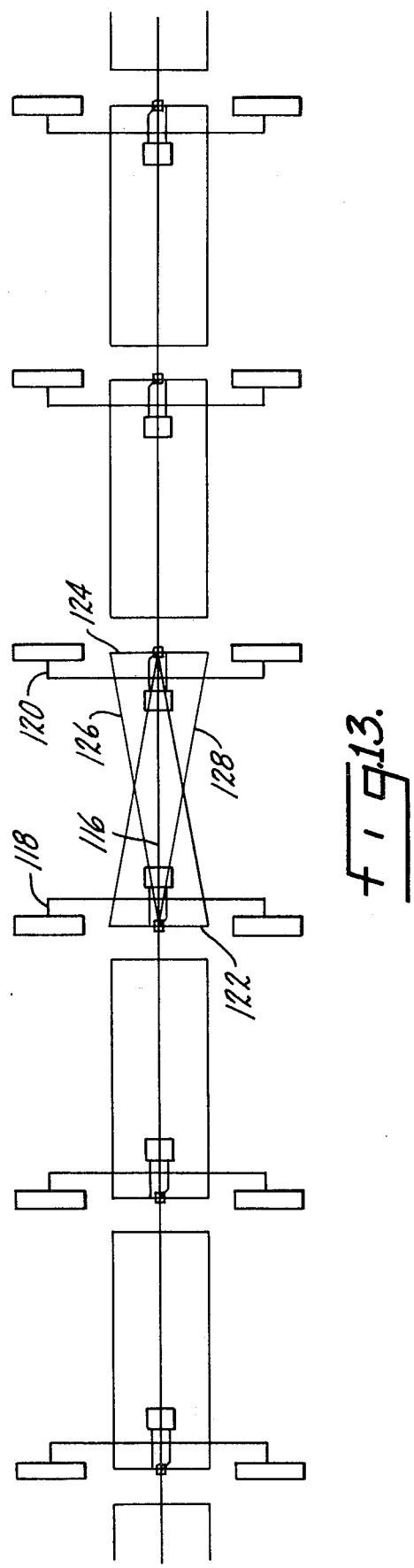

LATERALLY MOBILE IRRIGATION SYSTEM

This is a continuation of application Ser. No. 955,941, filed Oct. 30, 1978, now abandoned.

SUMMARY OF THE INVENTION

This invention relates to agricultural irrigation systems. While such systems are well known, practical utilization of them in the past has been limited on the whole to the so-called center pivot units. Such units have a sprinkling pipe mounted on mobile towers which travel in circles about a pivot point where the water is also supplied. Motion is obtained by independently driving the outermost tower and then moving inside towers as needed to maintain a generally straight-line relationship among the pipe segments. It can be seen then that a center pivot unit need only propagate alignment signals from the outside in. An inherent disadvantage of the center pivot system is that most agricultural fields are rectangular or square and the center pivot system does not irrigate the corners of such a field. The missed area amounts to approximately twenty-two percent of the area of a square circumscribed about the circle irrigated by a center pivot system.

An irrigation unit which moves in a straight line across a field, lateral to the pipe, obviates this problem of missing portions of the field. However, such linear-motion systems have been difficult to control because the entire system moves and there is no reference point or fixed end for maintaining proper position of the system. More particularly the one-way alignment signal propagation used in center pivot units is inadequate for controlling a laterally moving system.

Therefore, a primary object of this invention is a linear motion irrigation system which is fully controllable to assure that the unit will stay on its path.

Another object is a movable irrigation system that gives 100 percent coverage of the field.

Another object is a system of the above type with an improved application rate.

Another object is a system of the above type that has uniformity of its application rate.

Another object is an irrigation system that has reduced friction losses.

Another object is a system with a direct linear relationship of its application rate.

Another object is a system of the above type which has a uniform application of herbicides and insecticides.

Another object is a unit of the above type in which the wind effect will be more uniform.

Another object is a unit of the above type in which the evaporation rate will be improved.

Another object is a unit of the above type which is less complex than center pivot units which have an arrangement for watering the corners.

Another object is a unit of the above type which is more compatible with harvesting equipment in that the ruts created are parallel and not circular and harvesting equipment can move parallel to the ruts.

Another object is a unit of the above type which has less hydraulic loss.

Another object is a movable irrigation system which is much more compatible with other farming practices.

Another object is a lateral moving unit which may be more easily automated.

Another object is a unit of the above type which is much more efficient in labor required, water used, and fuel consumed.

Another object is a two-way signal propagation means which allows the unit to be steered in either direction should it deviate from its desired path.

Another object is a linear motion irrigation unit in which most of the control hardware may be the same as that used in center pivot systems.

Another object is a steering system for a linear motion irrigation unit which does not require speed controlling means for the towers other than the independently driven towers.

Another object is a steering control system which senses the return to the normal path and disengages the path-correcting signal so as to prevent overcorrection.

Another object is a linear-motion irrigation unit which carries a self-contained power unit including an engine-generator set and a water pump.

Accordingly, the invention is directed to a mobile irrigation unit of the type having a pipe string supplied with water under pressure with sprinkler units thereon for irrigating an agricultural field. The pipe is supported at intervals by wheeled towers which have motors for propelling the towers across the area to be irrigated in a generally straight line, perpendicular to the pipe string. Means are provided for detecting misalignment between segments in the pipe string and for activating the tower motors in response to such misalignment. The improved method of steering the irrigation unit comprises the steps of:

(1) independently driving the towers at two ends of the pipe string, (2) activating inboard tower motors in response to misalignment created by motion of adjacent towers, (3) sensing the overall location of the unit with reference to a designated path, (4) generating a correction signal when the unit deviates from the path, (5) utilizing the correction signal to stop or slow down the independent motion at the end tower, in which direction a path correction is required. In this operational mode the unit motion is primarily governed by the advancement of the tower at the opposite end which causes the entire unit to pivot about a point at or beyond the other end. This brings the unit back toward the desired path. The correction signal is released as the unit begins to return to the desired path so as to avoid overcorrection.

BRIEF DESCRIPTION OF THE DRAWINGS

FIG. 1 is a schematic plan view of a linear motion irrigation system in accordance with the present invention;

FIG. 2 is a schematic side view of the irrigation unit;

FIG. 3 is a schematic plan view of the irrigation unit and its tower-motion alignment signal propagation means;

FIGS. 5 and 6 are perspectives of portions of the path sensor, partially exploded;

FIGS. 7 and 8 are perspective views of the motor-activating means and the tower-motion alignment signal propagation means;

FIGS. 9 and 10 are perspective views of another embodiment of the motor-activating means and tower-motion signal propagation means;

FIG. 11 is a perspective view of the power unit sling support;

FIG. 13 is a schematic similar to FIG. 3.

DESCRIPTION OF THE PREFERRED EMBODIMENT

Figure 4:
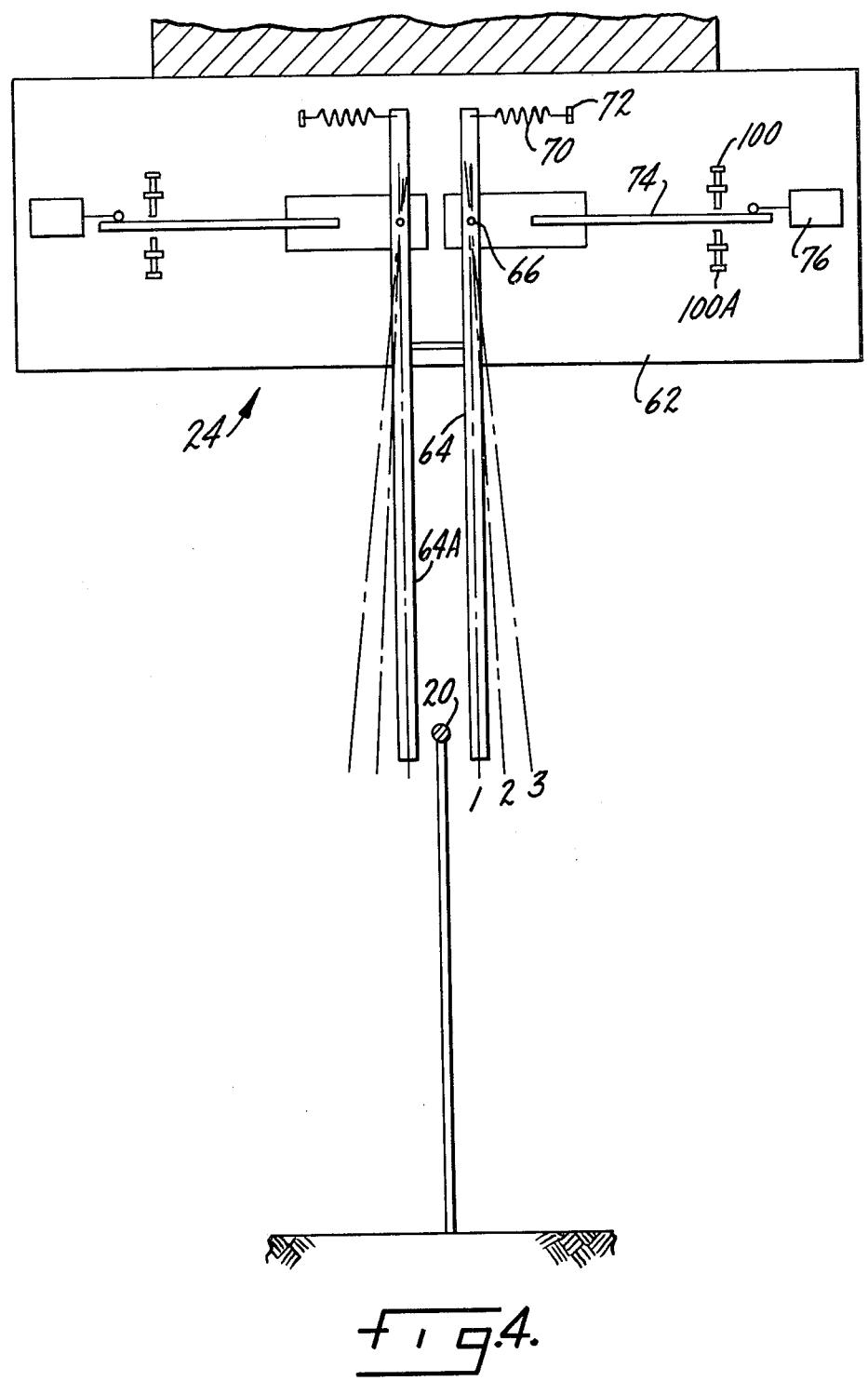
FIG. 4 is a side view of the path sensor.

FIG. 1 is a schematic of a mobile agricultural irrigation system 10. The system may be considered to be made up of a series of joined pipe segments or spans 12 supported by wheeled towers 14 and a truss structure 16. The pipe segments 12 are jointed by flexible couplings at joints 18. The system is designed to move laterally across a field, powered by motors, either electric, hydraulic, or otherwise, on the individual towers, following a path defined by a path-defining means or reference line or guidance reference 20, which may typically be a wire supported on or near the ground by stakes but, in certain situations or installations, could be a pipe or track or signalling system built on or in the ground, possibly below the surface.

A power unit 22 in the nature of a power pack is suspended from the pipe string 12, as disclosed hereinafter. This unit may include an engine for driving one or more main water pumps. In the preferred embodiment, the engine also drives a generator which provides electric power for the tower motors, but it might be the generator for a hydraulic system. The details of the power pack or power unit and its support will be explained hereinafter.

FIG. 2 shows the irrigation system as it might be arrayed or disposed across a field including a guide arrangement or sensing unit 24 whose function will be described in detail below. A water supply unit which, in this case, is shown as an open ditch 26, is constructed or arranged more or less in a straight line, although it might be otherwise. The ditch provides a source of water to be picked up for distribution by the system. It will be understood that the particular number of towers, shown in FIGS. 1 and 2, is not critical and could be different from the actual number shown. An equal number of spans and/or towers on each side of the ditch is not required.

Generally each pipe segment is supported by and rigidly connected to a tower. Moreover, the tower span connection is made at one end of the span, in this case shown as the one nearest one end or the other of the machine or unit 10. For purposes of identification, the end with the tower connection will be referred to as the tower end or outboard end of the span, with the opposite end being referred to as the free or inboard end. It will be understood that the free or inboard end is joined by a flexible joint or coupler to the tower end of the next inside pipe segment. For purposes of description, each tower and pipe segment has a letter designation and, in general, the letters are common to corresponding tower and span pairs.

The foregoing description is not applicable at selected intermediate points of the pipeline. The spans at these points are rigidly connected to towers at both ends of the span. Thus, spans 12D and 12G have no free end. Together with towers 14D, 14E, 14F and 14G, respectively, they form two more or less rigid four-wheel vehicles. Two flexible joints 18M and 18N are located between the four-wheel vehicle to provide pipeline flexibility and steering control.

FIGS. 7 and 8 show the components of a typical pipe connection and the associated controls which activate the tower motor. Referring to both Figures, the free end 28 of a pipe section is coupled to the tower end 30 of the next inboard section. A flexible split coupler 32, such as shown in U.S. Pat. No. 3,994,514, seals the two pipe ends relative to each other so that water does not leak. The coupler positions the pipe extremities in spaced relation so as to allow certain angulation of one pipe relative to the other throughout the full 360° of its circumference. The coupler is primarily a sealing device and is not intended to be the structural member responsible for holding the pipe string together. That task is performed by a universal joint indicated generally at 34.

One type of universal joint is the double clevis arrangement shown in FIG. 8, which allows for both vertical and horizontal angulation of one pipe section relative to another but does not permit longitudinal pipe movements. The joint comprises a horizontal yoke 36, a vertical yoke 38, both pivotally connected to a gimbal ring 40 by capscrews or the like 42. A horizontal yoke 36 is fixedly attached to the free end of a pipe span. A vertical yoke 38 is fixedly attached to the tower end of a pipe span. As noted above, the spans 12D and 12G have no free ends so those spans carry only vertical yokes. Also, the center spans 12E–12F, which are rigidly connected together by a T-joint, have no tower ends so they carry only horizontal yokes. These correspond with vertical yokes on the inboard ends of spans 12D and 12G to form joints 18M and 18N (FIG. 3). The gimbal ring 40 is free to rotate about a vertical axis Y or horizontal axis X (FIG. 8) according to the angulation between pipe segments. As will be pointed out below, rotation of the gimbal ring about the vertical axis Y is one of the inputs utilized to activate the tower motors.

The motor activating means comprises the universal joint, a motor switch arm coupled to the motor switch, a control arm and control wires. A switch arm and switch 44 are mounted on the control box 46 which is enclosed by a cover. A bracket 48 extends from the gimbal ring 40 to support the control box 46 conveniently near the tower 14, providing good service access. Actuation of the switch and arm 44 causes power to be supplied to the tower motor. The switch arm is connected by linkage 50 to a control rod 52. The rod, in turn, is attached to a control arm 54 which is mounted on a pivot 56 which in turn rests on the top of the gimbal ring 40. The control rod 54 is free to pivot about vertical axis Y on pivot 56 but is normally restrained to a fixed position, transverse to the pipe string, by control rods or wires 58. These wires are fixed to the outer ends of the control arm and extend inboard toward the free end of the pipe section where they are anchored to a spreader bar 20, shown in FIG. 7, which is rigidly attached to the free end of the pipe. The purpose of the spreader bar is to prevent entanglement of the control wires in the support truss 16.

The guide or sensing unit 24 is shown in FIGS. 4–6 and includes path sensing means and heading correction signal generating means, or the like. The guide means is mounted to a suitable base plate or member 62 and is enclosed by a housing. The base and housing are suspended somewhere along the pipe string, preferably in the middle of the string, although it need not be so. The path-sensing means comprises a pair of quills 64 and 64a. As can be seen in FIGS. 4–6, the quills 64 and 64a are each mounted or otherwise connected to a shaft 66.

Each such shaft is supported in a bearing 68 which is welded or otherwise rigidly fastened to the outside surface of the base plate 62. Return springs 70 are connected between the top of the quills and the brackets 72. The quills extend to a point where they are disposed on each side of the path-defining means, shown in this case as a wire 20. Thus the quills may be considered to enclose the path-defining means, be it a wire, cable, or otherwise.

The correction signal generating means associated with each quill includes an arm 74, switch 76, a friction drive 78, a one-way clutch 80, and a timing device 82. The arms of switch 76 are spring-biased to the neutral or open condition. The one-way clutch 80 includes a housing 84 enclosing a clutch element 86 and bearings 88. The clutch 80 is mounted on shaft 66 which extends through the base plate 62. The clutch housing 84 has a projection 90 for supporting the arm 74. The friction drive 78 includes a stub shaft 92 pinned to projection 90, a coil spring 94, and washers 96 which are held on the stub shaft by a lock nut 98, or the like. Stops 100 and 100a are affixed to the base plate 62 on either side of arm 74.

It will be understood that while a double quill arrangement has been described and shown, any path-sensing means could be used. For example, a single quill with forked end enclosing a path-defining means would be acceptable and would function quite efficiently. Indeed, mechanical sensing means in certain situations or installations is not a necessity as electro-optical devices could be used in certain applications to sense a deviation from the path and the start of a correction back toward the path.

The operation of the irrigation unit is as follows:

The normal lateral movement of the system is obtained by independently driving two master towers according to a prechosen program. All of the remaining are slave towers and move in response to the master towers, moving at such times as are necessary to maintain the pipe string in alignment. The master tower can be controlled by an adjustable primary timer which may call for the continuous forward motion of the outside towers or for a stepwise progression where the towers are driven for selected intervals and then turned off for an interval. The particular program chosen will depend on the amount of irrigation desired for a particular field. It has been found preferable to make the towers at the two ends of the unit or system, the master towers with all intermediate or inboard towers being slave towers. While this arrangement is preferred and will be used in this description, it is not absolutely essential. The master towers could be elsewhere than at the ends.

The forward motion of the master towers 14A and 14J moves the tower end of the outermost pipe segments 12A and 12J forward. This in turn causes a horizontal angulation between pipe segments 12A-12B and 12J-12I. This angulation is reflected at the free ends of spans 12A and 12J by motion of the horizontal yoke 36 or 102 which causes the gimbal ring 40 to rotate about vertical axis Y, in FIGS. 8 and 10. The mounting of control box 46 requires the box to rotate with the gimbal ring. However, since the control arm 54 is pivoted about the vertical axis Y, it does not rotate as it is fixed by control wires 58. Thus, there will be a relative movement between the control box 46 and the control arm. This movement actuates switch arm 44 through control rod 52 and linkage 50. This activates the motors on the slave towers 14B and 14I, thus setting those towers in motion.

As towers 14B and 14I move forward, the horizontal yoke at the free end of pipe segments 12B and 12I rotates the gimbal ring at the next universal joint, again about vertical axis Y. This in turn trips the switch in the towers 14C and 14H control boxes and the process starts for the next pipe segment. This misalignment signal propagates from both end towers 14A and 14J toward the middle of the pipe string. At some intermediate point the two signals will meet and be canceled. If the machine is symmetrical, as in FIGS. 1 and 2, and if both sides of the unit are progressing at the same speed or rate, the inwardly propagating signals will meet and be canceled at the middle segment 12E and 12F.

The alignment signal propagation across the four-wheeled vehicles that spans 12D and 12G is somewhat different. These spans have no free end available to cause gimbal ring rotation. So control wires 58 are used instead to rotate control arm 54. For example, looking at FIG. 3, when tower 14D moves ahead of tower 14E the control wires 58X, fastened to spreader bar 60X, cause rotation of control arm 54X. This in turn trips switch arm 44 at joint 18M and starts the tower motor on tower 14E. Conversely, if tower 14E moves ahead of tower 14D, control wires 58Y fastened to spreader bar 60Y cause rotation of control arm 54Y. This trips the switch and starts the motor on tower 14D. A similar arrangement is provided across span 12G.

It will be understood that during normal operation alignment signals will be propagated in both directions, from time to time, at any point along the machine. While the primary impetus activating the slave towers is the master tower motion, with its resulting outside-in alignment signal, there will be a need to propagate signals in the opposite direction also. For example, suppose spans 12A and 12B are aligned but 12B and 12C are not. The tower 14C will be activated, carrying the free end of span 12B forward. This will negate the prior alignment between spans 12A and 12B. Thus, tower 14B will require the capability of responding to slave tower 14C's motion, as well as that of master tower 14A. The present invention accomplishes this as explained hereinafter. When the irrigation unit 10 is following the desired path, quills 64 and 64A are on either side of the cable or wire 20 but do not necessarily touch it. In this situation each quill and arm are in their neutral or home position, which is indicated as position 1 in FIG. 4. In this neutral or home position they may be considered to be at a certain angle to each other, which will be referred to as the home angle. If the irrigation unit strays from its desired path, which it will, one quill or the other say for example the quill 64, will contact the wire or cable 20 which will cause rotation of the shaft 66 away from its home position 1 in FIG. 4 toward position 2. When this happens, the clutch element 86 engages housing 84 causing it to rotate with shaft 66. The friction drive 78 connects the housing 84 and arm 74 so that they rotate together, thereby maintaining their home angle relationship between the arm 74 and quill 64. This motion of arm 74 actuates switch 76 which in turn actuates the timing device 82, by a circuit not shown but which may be conventional, which generates a path-correction signal whose function will be explained below. Once the switch 76 has been actuated, arm 74 will then engage the stop 100 to prevent further motion which could damage or decrease the sensitivity of the switch. Should the machine continue its off route or wayward path, causing the quill 64 to be moved out toward position 3, the friction drive permits the arm to slip on projection 90, thus allowing the housing 84 to continue rotation with the shaft 66 even though the arm 74 is held fixed by stop 100. The arm and quill will now form an angle less than the home angle.

When the unit begins to correct its heading, the quill moves back toward position 2. Since at this position the quill and arm form less than the home angle, some relative rotation is desirable to return both elements to their neutral position. Upon the initial return motion the quill 64, shaft 66, clutch 80 and arm 74 all rotate together toward the home or neutral position. Since the arm's initial rotation was limited by stop 100, it has only a short arc to move to regain its home position. This is accomplished with the accompanying release of switch 76, under the urging of the spring-loaded switch arm. Also, during the return rotation the clutch element 86 disengages housing 84. When that disengagement occurs, the quill 64 is disconnected from the clutch housing 84 and also from arm 74 which allows the quill to regain its home position under the force or urging of the return spring 70.

If the one-way clutch 80 was not provided, the arm would continue its return rotation until abutting stopped 100a. The spring 70 would have to overcome the friction between arm 74 and housing 84 to get quill 64 back to its home position. While this could be done, it would require a much stronger return spring. This would greatly reduce the sensitivity of the device.

When the machine strays from the desired path, the guidance means will act to correct the heading of the unit to bring it back to the proper path. If, for example, the machine strays to the left, quill 64 will contact guide cable 20 which will cause the cable to move toward position 3 shown in FIG. 4. This activates the secondary timer 82 which interrupts the normal control of the primary timer over the master towers. The secondary timer alters the rate of one master. Preferably, it will cause the master tower 14J to reduce its forward speed, thus causing the machine to establish a new, corrected heading in the following manner.

The left-hand end tower 14A continues to move forward at its normal rate. This in turn moves the left side slave towers forward as they respond to misalignment caused by motion of the master tower. When the misalignment signal gets to the intermediate towers, it is no longer canceled by a corresponding signal coming from the right hand side of the machine because the right hand master tower has been shut down or slowed by the guidance means. In FIG. 3, it can be seen that as slave tower 14F moves forward, the control wires 58 will rotate the control arm 54 on the tower 14G. This in turn pushes the control rod and linkage to activate the switch in the control box which initiates motion of the tower 14G. As that tower 14G moves forward, its control wires 58 will cause the control arm of the next outboard tower 14H to pivot, tripping the motor switch, thus activating that tower. This signal propagation continues in the same manner all the way to the right hand end tower. The effect of this will be to cause the entire machine to pivot about a point beyond the right hand end tower, thereby establishing a corrected heading which will bring the machine back from the position to which it has strayed. As soon as the machine starts to correct its position, quill 64 will move from position 3 toward position 1. Immediately upon the start of the quill's return motion the one-way clutch 80 disengages. This in turn releases the rotational bias on arm 74, allowing the spring-loaded switch 76 to open. When the switch 76 opens the secondary timer 82 shuts off, thus returning the right master tower 14J to its primary rate. This action locks in the new heading as soon as the machine has started to return to the position from which it strayed. If the heading correction were to be continued until the machine had returned to its initial position, too much correction would result, thereby causing unacceptable hunting or lunging toward the guidance wire or cable with increasing amplitudes and frequencies which would eventually require the shutdown of the machine. If the machine were to stray to the right, quill 64a and its associated components will perform the same function as just described for quill 64.

To appreciate the desirability of two-way signal propagation, resort may be had to FIGS. 3 and 7. As explained above, normal inward signal propagation occurs upon rotation of the gimbal ring about the vertical axis. This rotation is caused by joint angulation created by motion of the free end 28 of a pipe segment. Thus if the tower shown in FIG. 7 is considered to be tower 14C, inward signal propogation occurs when tower 14B moves ahead of 14C, causing the horizontal yoke at the free end 28 of pipe segment 14B to rotate gimbal ring 40 about vertical axis Y. This moves the control box 46, tripping the switch to start the motor on tower 14C. So the pipe 12B itself transmits the inward signal. In contrast, pipe 12C cannot readily transmit an outward signal to tower 14C because the tower end 30 of pipe 12C is held fixed by the tower structure.

Outward signal propagation is needed when an inboard tower, such as 14D, moves ahead of an outboard unit, such as 14C. When this occurs the pipe segment 12B does not move so the free end of 12B cannot trip the switch through gimbal ring rotation as it does for inward propagation. Further, the tower end 30 of segment 12C cannot move to create a switch-tripping action because the tower end's position is held fixed by the tower 14C. Thus, without two-way signal propagation means, tower 14C would not "know" that tower 14D had moved ahead. Severe misalignment will result, forcing the shutdown of the unit. The present arrangement averts this breakdown by including tower motion signal propagation means in the form of control wires 58 and pivoted control arm 54. Since the control wires 58 are fixed to a spreader bar 60 near the free end of segment 12C, they will move forwardly with tower 14D. This motion of the wires causes a rotational motion of the control arm 54 at tower 14C. The free end 28 of pipe 12B, gimbal ring 40 and control box 46 all are stationary at this time, so there is relative motion between the arm and the control box. This trips the switch and activates the motor on tower 14C. So the control wires 58 transmit the outward signal. At the fourwheel vehicles the control wires transmit both inward and outward signals.

It will be noted that without the control wires, outward signal propagation would not take place even if there was joint angulation at tower 14C upon advancement of tower 14D. Such angulation would require the pipe 12C to impart torque to tower 14C sufficient to pivot it, overcoming the resistance of the tires on the ground. Even if such a scrubbing or skidding pivot were achieved, the result would only be a pivoting of vertical yoke 38 about vertical axis Y, in FIG. 8. There would be neither gimbal ring rotation nor control arm rotation to trip the switch and, hence, the motor on 14C would not start. Understandably, it is far superior not to force a scrubbing pivot of a support tower. The unit capable of doing that would be extremely expensive, as only short spans of very strong pipe could be used, a greater number of towers would be needed, and coupling the pipe segments would be a major problem. Use of control wires eliminates the need for using the pipe to transmit alignment signals outwardly.

Thus it can be seen that two-way signal propagation is desirable and that the universal joint, control wires and control arm of the present arrangement or equivalent means makes possible such two-way signal propagation utilizing the basic control box and tower motors of a normal center pivot system.

FIGS. 9 and 10 show an alternate embodiment of the motor-activating means which utilizes a torsion flexible joint 102 such as that shown in U.S. Pat. No. 3,983,898, which is similar to the universal joint 34 except that the horizontal yoke 102 and 104 is elongated and affixed to a pipe-hugging box 106. The control box is mounted directly on the horizontal yoke and moves with that portion of the joint. The spreader bar is shown as having been deleted so that the control wires are attached to the pivot 56 of the control arm. Other parts may be the same as in FIGS. 7 and 8 and the same reference numerals have been applied, where appropriate.

In FIG. 11 a self-contained power pack has been shown which incorporates various features which may be used or included with the present invention. A sling support 108 carries the power unit and has a rectangular frame 110 suspended from the main irrigation pipe 12 by rods or cables 112. The power unit rests on the frame 110 and may include an engine driving an irrigation water pump, not shown in this form. The pump picks up water from a source, such as the ditch 26, and supplies it under pressure to the pipe string through a T-joint or connection 114. If the tower motors are electric, the engine may also drive a generator to provide electric power. Or it may be a hydraulic setup.

The weight of the power unit dictates or makes it desirable that the length of the spans 12E and 12F supporting it be less than the regular span length. For example, a typical wheel-to-wheel distance between towers 14E and 14F may be 30 feet as compared to something on the order of 150 feet for the other spans. The shorter span length necessitates placement of joints 18M and 18N between towers 14E and 14F so that sufficient flexibility is provided to prevent loss of steering control. This joint placement leads to creation of the four-wheeled vehicle mentioned above, which is acceptable because the span length of 12D and 12G is sufficient to permit use of control wires in both directions across the pipe segments. The joint at 18M is a torsionally flexible joint, such as described in U.S. Pat. No. 3,983,898 and shown in FIGS. 9 and 10, for example.

While it is preferable to locate the support sling 108 and the associated foreshortened span at the middle of the machine, such a location is not required. The sling could be anywhere along the pipe string to accommodate the source of the water location or the ditch, or whatever it is. Likewise, while a symmetric machine has been shown and is preferred to cancel extraneous forces longitudinal to the pipe, a symmetric arrangement is not an absolute necessity and may not be desired in certain installations.

Figure 12:
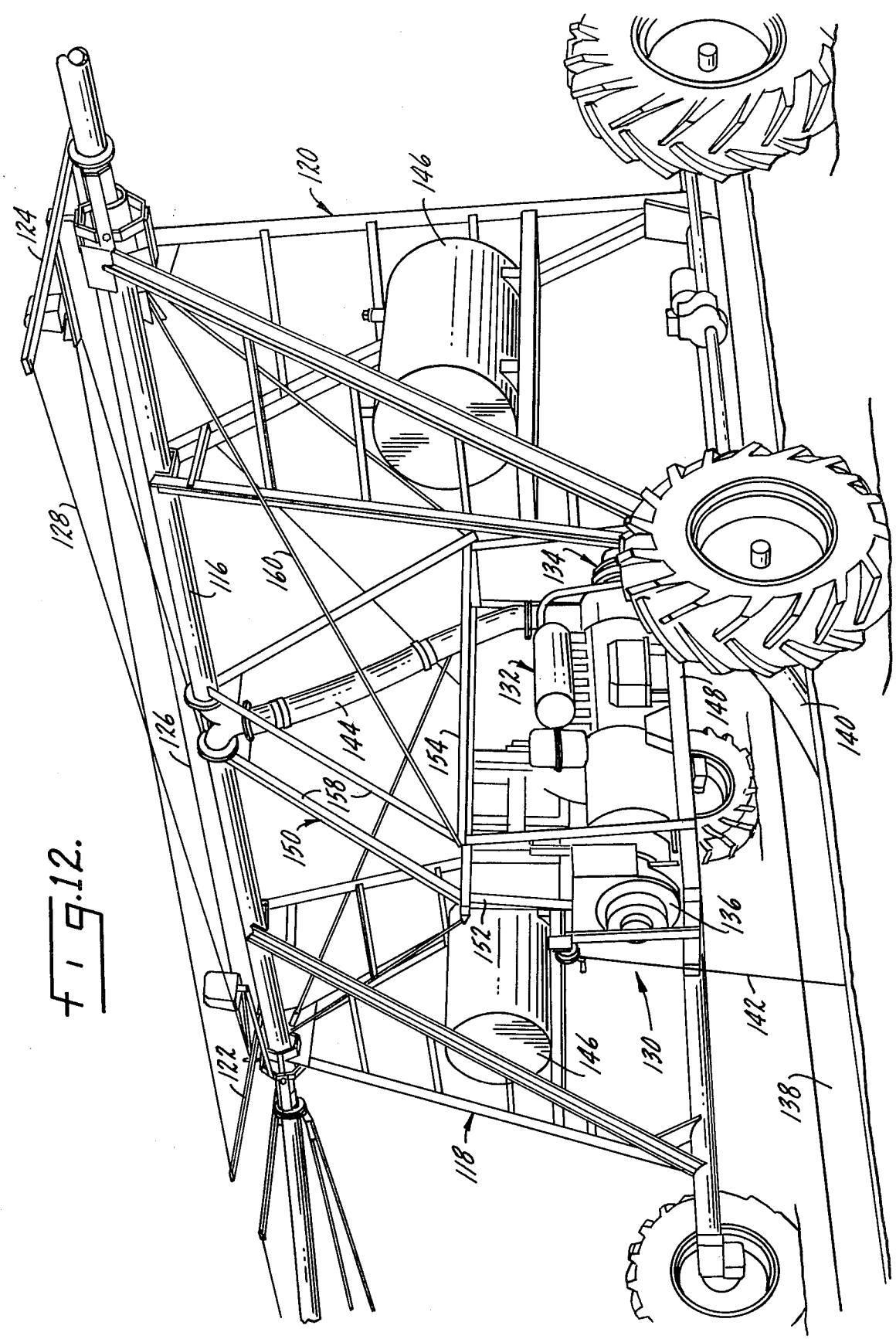
FIG. 12 is a perspective of a variant form of power unit.

In FIGS. 12 and 13 a variant form has been shown in which the middle pipe segment 116 does not have a free end as the middle towers 118 and 120 support both ends of the segment. The control rods 122 and 124 are both mounted on the gimbal ring's vertical axis or pivot, being axis Y, much like FIGS. 7 and 8, and the control wires thereto, at 126 and 128, are crossed so that as tower 118 moves forward the control wires 126 and 128 will rotate the control arm 124 on the other middle tower 120 and vice versa. This in turn actuates the switch in the control box which starts movement of the other middle tower 120. As tower 120 moves forward, its control wires, to the right in FIG. 13, will cause the control arm of the next outboard tower to pivot, tripping the motor switch, etc. This signal propagation continues in the same manner as set forth hereinbefore. Towers 118 and 120 are rigidly coupled to each end of the center span 116 so that, in a sense, the composite makes up a four wheel rigid frame or drive which, to turn slightly one way or the other, requires a slip or skid motion.

A self-contained power unit 130 is shown in FIG. 12 as including a suitable engine 132 which may drive both a pump 134 and a generator 136. The generator may supply electric power to the various tower motors. The pump picks up water from a water source, which may be an open ditch 138, through a suitable intake pipe 140. If the water source is a ditch, the position of the intake pipe to the ditch may be controlled by a cable or any other suitable means, as indicated at 142, connected thereto or a float attached to the intake pipe (not shown). Water is fed under pressure from the pump through a suitable riser 144 and through a T-joint to the main irrigation pipe 116. The engine may have a suitable gasoline or diesel fuel tank 146, possibly one on each tower. The engine, generator and pump may be mounted on a suitable platform or frame 148 which is suspended above the water source by a sling arrangement 150 which may include four straps 152 which rise to a rectangular carrier 154 or the like which is attached by angles 158 to the main irrigation pipe or center span 116. Guide wires or rods 160 may be appropriately disposed to prevent the sling from swaying excessively. As shown, four such rods are used, but there might be more or less. While the power unit or power pack is shown supported from the middle pipe segment 116, it should be understood that it could hang or be located at any position where the pipe is sufficiently rigid. The details of the power pack in FIG. 12 could be used in the FIG. 11 form.

While the preferred form and several variations have been shown and/or described, numerous additional modifications, substitutions, alterations and additions may be made without departing from the inventive theme.

The embodiments of the invention in which an exclusive property or privilege is claimed are defined as follows:

1. In a linearly mobile irrigation system having a pipe string with sprinkler units thereon, supported at intervals by mobile towers, motor means on the towers for propelling them in a direction perpendicular to the pipe string, means for activating the tower motors in response to misalignment between segments in the pipe string; an improved method of steering said mobile irrigation unit comprising the steps of:
   (1) independently driving at least two master towers at equal primary rates according to a prechosen program;
   (2) dependently driving all other slave towers by activating the slave tower motors at such times as required to maintain the pipe string substantially in a straight line;

(3) sensing the overall location of the system with reference to a designated path;

(4) generating a correction signal when the system strays from the path;

(5) utilizing the correction signal to alter the primary rate of advancement of at least one master tower thus establishing differential rates for the master towers which cause the entire system to pivot in the desired direction; and (6) releasing the correction signal to return the altered master tower to its primary rate as soon as the system begins to return to the designated path.

2. The method of claim 1 wherein the rate alteration step comprises slowing down the master tower nearest the pivot point about which the desired heading correction is made.

3. The method of claim 1 wherein the rate alteration step comprises speeding up the master tower farthest from the pivot point about which the desired heading correction is made.

4. The method of claim 1 wherein the master towers are located at the ends of the pipe string.

5. The method of claim 1 further characterized in that the designated path is defined by a wire disposed generally perpendicular to the pipe string.

6. The method of claim 1 further characterized in that the correction signal is an electrical impulse sent to one of the master towers.

7. In a mobile irrigation unit movable laterally across the field and having a main irrigation pipe string to be supplied with water under pressure for discharge onto the field through sprinkler heads on the pipe, the pipe string being comprised of a plurality of individual pipe segments joined together and supported at intervals by mobile towers, each tower being self-propelled by motors attached thereto, an improved steering system comprising:

(1) path defining means;

(2) sensing means for detecting location of the unit with reference to the path defining means; and (3) means responsive to the sensing means for generating a heading correction signal and for releasing said signal as soon as the unit begins to return to the intended path.

8. The structure of claim 7 wherein the path-defining means is a wire disposed laterally to the pipe string.

9. The structure of claim 7 wherein the sensing means is attached to the irrigation unit and encloses the path-defining means such that movement of the unit lateral to the path alters the normal condition of the sensing means.

10. The structure of claim 9 wherein the sensing means comprises:

(1) a base member rigidly attached to the irrigation unit;

(2) first and second quill members disposed on either side of the path-defining means and pivotally mounted to the base member such that overall unit deviation from the designated path causes one of the quills to contact the path-defining means with further deviation causing the quill to rotate about its mounting.

11. The structure of claim 10 further comprising springs for returning the quill members to their original positions after the unit deviation has been corrected.

12. The structure of claim 10 further comprising:

(1) connecting shafts rotationally mounted on the base member and supporting the quill members;

(2) switch-activating arms pivotally mounted on the connecting shafts and oriented such that rotation of the arm closes a switch;

(3) a pair of stops associated with each switch actuating arm, defining limits to rotation of the actuating arm;

(4) friction drives which rotationally connect each quill and arm so that they rotate as a unit until the arm contacts a stop; and (5) a one-way clutch which permits continued rotation of the quill while the arm remains stationary.

13. The structure of claim 9 wherein the sensing means in its altered condition trips a switch, activating a timing device, said timing device generating the heading correction signal which is supplied to one of the master towers to alter its primary rate of advancement.

14. The structure of claim 7 wherein the mobile towers include at least two master towers and a plurality of slave towers, the master towers being independently driven at primary rates according to the pre-chosen program while the slave towers advance in response to master tower motion to maintain the pipe string substantially in a straight line, the master towers being responsive to the heading correction signal such that occurrence of such signal alters the primary rate of advancement of at least one master tower, thus establishing differential rates for the master towers which causes the entire unit to pivot in the desired direction.

15. In a mobile irrigation unit movable laterally across a field and having a main irrigation pipe string to be supplied with water under pressure for discharge onto the field through sprinkling heads on the pipe, the pipe string being comprised of a plurality of individual pipe segments joined together and supported at intervals by mobile towers, each tower having a propulsion motor and motor-activating means responsive to pipe misalignment so as to cause the tower to be propelled at such times as required to maintain the pipe substantially in a straight line; an improved method of propagating misalignment information from a first tower to adjacent ones on either side comprising the steps of:

(1) transmitting such information in one direction via the intervening pipe segment which is connected to the motor-activating means of the adjacent tower such that motion of the first tower causes the pipe to initiate the function of said motor-activating means; and (2) transmitting misalignment information in the opposite direction via at least one control wire fastened near the first tower and extending to the motor-activating means of the adjacent tower so that motion of the first tower causes the control wire to initiate the function of said motor-activating means.

16. In a mobile irrigation unit movable laterally across a field and having a main irrigation pipe string to be supplied with water under pressure for discharge onto the field through sprinkler heads on the pipe, the pipe string being comprised of a plurality of individual pipe segments joined together and supported at intervals by mobile towers, including two end towers and at least one inboard tower, each tower being self-propelled by motors attached thereto, an improved pipe string alignment maintenance system comprising:

(1) motor-activating means at each inboard tower responsive both actual pipe segment misalignment and to adjacent inboard tower motion so as to cause the inboard tower to be propelled at such times as required to maintain the pipe string substantially in a straight line; and (2) tower-motion signal propagation means connected to each motor-activating means to as to initiate the function of said motor-activating means upon the advancement of at least one adjacent inboard tower.

17. The structure of claim 16 wherein the tower-motion signal propagation means comprises at least one control wire attached to the motor-activating means of a tower, the wire extending to a fixed attachment point near an adjacent tower whose motion is to be detected at the motor-activating means of the first tower.

18. The structure of claim 16 wherein an inboard motor-activating means is located at each flexible joint between pipe segments and a tower is associated with each motor-activating means, said means comprising:

(1) a control box movable with one of the pipe segment ends, having a switch therein which, when closed, allows power to be supplied to the motor; and (2) a pivotable control arm connected by a linkage to the switch, the control arm being rotatable by the tower-motion signal propagation means but not by motion of the control-box-carrying pipe end so that either motion of that end or activation of the signal propagation means produces a relative motion between the control box and control arm which closes the switch and supplies power to the motor of the associated tower.

19. The structure of claim 18 wherein the motor-activating means further comprises horizontal and vertical yokes pivotally supporting a gimbal ring, one yoke attached to either end of adjoining pipe segments with the gimbal ring surrounding the pipe and the control arm mounted on the gimbal ring such that its pivot point is coaxial with the vertical yoke's axis so pivoting motion of the horizontal yoke about said axis causes no rotation of the control arm; the control box being mounted such that it is movable with the horizontal yoke, thus when either the horizontal yoke or the control arm moves the other will not, thereby producing said relative motion.

20. The structure of claim 16 further comprising motor-activating means at each of the two end towers responsive to tower motion of the one inboard tower adjacent to them so as to cause the end towers to be advanced should either of them lag behind the adjacent inboard tower.

21. In a mobile irrigation unit movable laterally across a field, a main irrigation pipe string, a water source disposed across the field generally transverse to the pipe string, a plurality of mobile towers supporting the pipe string, a propulsion motor on each tower, an alignment maintenance system, a steering system and a power unit sling support suspended from the main irrigation pipe for carrying an engine which drives an irrigation water pump.

22. The structure of claim 21 wherein the water source is a ditch supplied with water.

23. The structure of claim 21 wherein the propulsion motors are electric motors, supplied from an electric power generator which is also carried by the sling support, the generator being driven by the same engine that drives the pump.

24. A movable irrigation system including a pipeline supported at intervals on movable towers and constructed and arranged for generally linear movement across a field to be irrigated, means for propelling the system across the field along an intended path, a generally rectilinear reference line across the field defining the intended path, and sensing means on the system to sense the position of the system relative to the reference line and to apply corrections to the propelling means when the system deviates from the intended path and to release said corrections as soon as the system begins to return to the intended path.

25. The structure of claim 24 further characterized in that when the irrigation system is following its intended path the sensing means encloses but does not contact the reference line whereas when the irrigation system deviates from the intended path, the sensing means will contact the reference line, thus causing the sensing means to apply corrections to the propelling means.

26. The structure of claim 25 wherein the sensing means comprises:

(1) a base unit rigidly attached to the irrigation system;

(2) first and second quill members disposed on either side of the reference line and pivotally mounted to the base member such that deviation from the intended path causes one of the quills to contact the reference with further deviation causing the quill to rotate about its mounting.

27. The structure of claim 26 further comprising:

(1) connecting shafts rotationally mounted on the base member and supporting the quill members;

(2) switch-activating arms pivotally mounted on the connecting shafts and oriented such that rotation of the arm closes a switch;

(3) a pair of stops associated with each switch-actuating arm, defining limits to rotation of the actuating arm;

(4) friction drives which rotationally connect each quill and arm so that they rotate as a unit until the arm contacts a stop; and (5) a one-way clutch which permits continued rotation of the quill while the arm remains stationary.

28. A pipe joint for flexibly joining the end of a first pipe to the end of a second pipe positioned and axially aligned with each other with their ends adjacent with each other, a coupler sleeve surrounding the ends of both pipes for flexibly sealing them together, supports flexibly joining the pipe ends including a universal joint having a pair of pivot arms for and spaced outwardly from each pipe end, each pair of arms being mounted 180° apart on the pipe end and projecting toward the other pair which are indexed 90° thereto, a ring surrounding and spaced outwardly from the coupler sleeve and jointed alternately to the pair of arms, and a control, including a box element and a switch element therefor each movably mounted relative to the pipe joint and each other.

29. The structure of claim 28 further characterized by and including a pipe string made up of pipe sections each of which is supported on a movable tower connected at one end of the pipe section so that each pipe section has a tower end and a free end with the free end of one section being joined by the pipe joint to the next pipe section at the tower end thereof, means responsive to movement of the free end of one section for energizing the switch element by moving one of the elements relative to the other, and means responsive to movement of the free end of the next pipe section for energizing the switch element by moving the other element relative to the one element.

30. A movable pipe string for irrigation purposes made up of a plurality of interconnected pipe sections, each section including a pipe length supported on a movable tower connected at one end of the pipe length so that each pipe section has a tower end and a free end, the towers being self-propelled by a power means mounted thereon, a flexible pipe joint joining the tower end of one pipe section to the free end of the next pipe section, a control including a switch at the pipe joint to provide at electric signal for operating the power means, means for actuating the switch and for thereby operating the power means to move the tower of the one pipe section in response to forward angulation of the next pipe section due to forward movement of the tower end of the next pipe section, and means for actuating the switch and for thereby operating the power means to move the tower of the one pipe section in response to forward motion of the free end of the one pipe section.

31. An elongated linear movable irrigation system including a pipeline supported at intervals on movable towers and constructed and arranged for generally linear motion across a field to be irrigated, the pipeline being made up of a plurality of interconnected pipe sections, each section including a pipe length supported on a movable tower connected at one end of the pipe length so that each pipe section has a tower end and a free end, a flexible pipe joint joining the tower end of one pipe section to the free end of the next pipe section, the pipe sections forming each end of the pipeline being arranged with their tower ends disposed outwardly, and an intermediate movable vehicle connected to the free end of the inner pipe sections on each side thereof.

32. The structure of claim 31 further characterized by and including an elongated water supply disposed in the direction generally at right angles to the pipeline, and a connection to the pipeline at the vehicle for supplying water thereto from the water supply.

33. The structure of claim 31 further characterized in that the vehicle is generally in the middle of the pipeline.

34. The structure of claim 31 further characterized by and including a control including a switch at each of the flexible pipe joints for controlling the movement of each of the pipe sections, including means for actuating the switch and for thereby operating the pipe sections to move one pipe section in response to forward angulation of the next pipe section due to forward motion of the free end of the next pipe section, and means for activating the switch and for thereby operating the pipe section for moving the adjacent end of the one pipe section in response to forward motion of the free end of the one pipe section.

35. The structure of 31 further characterized in that the intermediate movable vehicle is in the form of a pipe span with towers connected to each end thereof.

36. An elongated linear movable irrigation system including a pipeline supported at intervals on movable towers and arranged for generally linear movement across a field to be irrigated, a generally rectilinear water supply between the ends of the pipeline and generally at right angles thereto, a vehicle structure in the pipeline at the water supply including a generally rectangular four-wheeled vehicle with a wheel on each corner thereof including two pairs of wheels, two wheels to a pair, the two wheels of a pair being generally aligned in the direction the pipeline travels, a drive for each pair, and a control for the drive with a signalling system for causing a differential motion between the pairs of wheels to effect a heading change in the direction of the movement of the vehicle.

37. The structure of claim 36 further characterized in that the system includes one such vehicle which is generally in the center of the pipeline and straddles the water supply.

38. The structure of claim 37 further characterized by and including an engine generator and pump set on the vehicle for pumping water from the water supply to the pipeline and for supplying power to the movable tower.

39. The structure of claim 38 in which the engine generator and pump set is mounted on a sling suspended on the vehicle.

40. The structure of claim 37 further characterized by and including two such vehicles in the pipeline positioned adjacent each other on each side of the water supply.

41. A movable pipe string for irrigation purposes made up of a plurality of interconnected pipe sections, each section including a pipe length supported on a movable tower connected at one end of the pipe length so that each pipe section has a tower end and a free end, the towers being self-propelled by a power means mounted thereon, a flexible pipe joint joining the tower end of one pipe section to the free end of the next pipe section, a control including a switch at the pipe joint to provide an electric signal for operating the power means, means for actuating the switch and for thereby operating the power means to move the tower of the one pipe section in response to forward movement of the tower end of the next pipe section, and means for actuating the switch and for thereby operating the power means to move the tower of the one pipe section in response to forward motion of the free end of the one pipe section.

42. The structure of claim 41 further characterized in that the means for actuating the switch in response to forward movement of the tower end of the next pipe segment includes means responsive to forward angulation of the next pipe section.

43. The structure of claim 41 further characterized in that the means for actuating the switch in response to forward motion of the free end of the one pipe section includes a wire connected to the free end of the one pipe section and extending to tower end of the one pipe section to transmit forward motion of the free end to the tower end.

* * * * *